United States Patent [19]

Lesokhin et al.

[11] 4,229,671
[45] Oct. 21, 1980

[54] MULTITURN COIL FOR FIELD POLES OF DYNAMOELECTRIC MACHINE

[76] Inventors: Albert Z. Lesokhin, ulitsa Chekhova, 8, kv. 22; Evelina A. Daikhovskaya, ulitsa Basseinaya, 85, kv. 202; Ilya Z. Boguslavsky, ulitsa Ordzhonikidze, 33, kv., all of Leningrad, U.S.S.R.

[21] Appl. No.: 789,976

[22] Filed: Apr. 22, 1977

[51] Int. Cl.² ............................................. H02K 3/00
[52] U.S. Cl. .................................... 310/198; 310/64; 310/71
[58] Field of Search .................. 310/54, 58, 59, 60 A, 310/64, 65, 71, 269, 179, 180, 184, 198, 199, 200, 201–208; 336/180; 322/90

[56] References Cited

U.S. PATENT DOCUMENTS

| | | | |
|---|---|---|---|
| 1,481,585 | 1/1924 | Beard | 336/180 |
| 1,630,757 | 5/1927 | Perkins | 310/180 |
| 2,071,977 | 2/1937 | Herrick | 310/208 |
| 3,261,995 | 7/1966 | Kohn | 310/269 |
| 3,275,864 | 9/1966 | Fennell | 310/71 |
| 3,392,356 | 7/1968 | Cotsaftis | 336/180 |
| 3,497,737 | 2/1970 | Philofsky | 310/54 |
| 3,566,171 | 2/1971 | Tichy | 310/180 |
| 3,753,015 | 8/1973 | Konovalov | 310/64 |
| 3,870,913 | 3/1975 | Shapiro | 310/54 |

FOREIGN PATENT DOCUMENTS 1252316 10/1967 Fed. Rep. of Germany ............ 336/180
2327042 12/1974 Fed. Rep. of Germany ............ 336/180

*Primary Examiner*—R. Skudy
*Attorney, Agent, or Firm*—Burgess, Ryan and Wayne

[57] ABSTRACT

A multiturn coil assembly with direct water cooling, for use in dynamoelectric machine field poles, has several horizontal layers of turns and several vertical rows of turns, and includes three individual windings formed from hollow copper conductors of rectangular cross section, the windings being concentrically arranged and electrically connected in series. Each winding occupies a single vertical row, has an equal number of turns wound in the same direction and is arranged so that the terminals of all the windings positioned adjacent one another on end surfaces of the coil extend along one side of the coil. All winding terminals are connected by brazing on one of the outer coil sides, which decreases both the coil height and the number of brazed joints, and ensures easy access to the joints for inspection and maintenance.

5 Claims, 2 Drawing Figures

MULTITURN COIL FOR FIELD POLES OF DYNAMOELECTRIC MACHINE

The present invention relates to the art of heavy duty electrical engineering, and more particularly to multiturn coils for field poles of dynamoelectric machines.

The invention can most advantageously be used in salient poles for synchronous electric machines, such as heavy duty slow-speed synchronous motors or encapsulated hydrogenerator with direct water cooling, with the pole coils having turns arranged in several rows across the pole section and in several layers over the pole height.

The field poles of, e.g., an electric machine rotor accommodate a core comprising a plurality of stacked steel laminations, and a coil wound of conducting material strips on said core with insulation between the turns.

Such a coil constitutes a part of a rotor field winding of a dynamoelectric machine.

The high power level of a dynamoelectric machine makes it necessity to increase the magnetizing force of the field winding which, in turn, calls for high current levels in the winding resulting in subsequent rise in the cooling efficiency of the windings and a requirement for direct fluid cooling.

In water-cooled rotor poles heat removal is achieved by water circulating within the hollow coil conductors, generally of rectangular cross section. It is then difficult to arrange the pole coil turns in a single vertical row, one above another, as it is customary to do in the case of conventional windings with air cooling, without increasing significantly the pole core dimensions and particularly the height thereof. Therefore, it is necessary to provide a coil comprising several rows of adjoining turns surrounding the pole core and, in this case, the turn ends of said rows are required to be electrically connected. In a multiturn coil there may be several turn ends which are usually connected by brazing, their arrangement being of some interest especially in the case of a fluid cooled winding when it is required to provide easy access to the connections for inspection and repair.

There are known single winding coils. Such coils are free from brazed joints of the turn ends except when the total length of all the turns exceeds the conductor length in the reel.

The most serious disadvantages of the single winding coil are that it is impossible, on the one hand, to wind the required large number of turns at prescribed overall dimensions of the pole and cross section of a conductor and, on the other, the coil height is greater than the total height of the conductor wound in one vertical row with insulation between adjacent turns, since one horizontal coil layer is occupied by terminals.

There are also known multiturn coils composed of single winding coils wound in a single horizontal layer of turns coiled around the pole core. Such a pole coil may comprise an appropriate number of vertically stacked single winding coils according to the required number of turns in the vertical row. The terminals of these single windings are brazed together, the terminal connections being both inside and outside the pole coil.

The disadvantages of the stacked single horizontal layer pole coils are the following:

a large number of brazed joints, which equals the number of individual windings or horizontal layers minus one complicating the manufacture of the pole coil and impairing its reliability;

connections being made inside the coil and consequently inaccessible for inspection and maintenance, which is especially objectionable in the case of coils with direct fluid cooling where there is a likelihood of leackage through such connections;

a large coil height at an odd number of horizontal layers, arising from the necessity to arrange the terminals outside the coil with the result that the total coil height equals to the total height of all the turns with insulation therebetween plus the height of the terminals occupying one horizontal layer.

These disadvantages increase the pole coil dimensions, deteriorate its operating characteristics and as a result reduce the reliability of the electric machine.

There is known a pole coil comprising two vertical rows of turns and assembled from two half-coils. The disadvantages of the coil consist in that connections are made both inside and outside the coil, and the coil terminals occupy one horizontal layer of turns as in the case of the pole coil mentioned above.

Also known is a multiturn pole coil comprising single winding coils. Such a coil assembly has three single winding coils, or windings, the first and second outer windings encircling the third inner winding and having corresponding surfaces adjacent each other, whereby the total height of the outer encircling windings is substantially equal to the height of the inner encircled winding. These three windings are electrically connected within the gap between the inner and two outer windings. Among the disadvantages inherent in the coil assembly are difficulties in connecting the windings and inaccessibility of such connections for inspection, especially from the sides of the coil, with the result that the coil assembly fails to ensure adequate operational reliability and maintenance of a dynamoelectric machine.

It is an object of the present invention to provide a multiturn pole coil assembly ensuring easy access to the connections of the coil terminals.

A further object of the present invention is to reduce the overall dimensions of the multiturn pole coil assembly of a dynamoelectric machine.

Another object of the invention is to increase the realibility of a dynamoelectric machine in operation.

With these and other objects in view, there is proposed a multiturn coil assembly for field poles of a dynamoelectric machine, comprising several horizontal layers of turns and several vertical rows of turns, and made up of individual windings electrically interconnected, wherein, in accordance with the present invention, each winding occupies a single row of turns over the entire height of the coil and has an equal number of turns wound in the same direction, said windings being concentrically arranged and oriented so that the first terminals of all the windings are disposed adjacent each other on one end surface of the coil assembly while the second terminals of all the windings are disposed identically on the other end surface of the coil assembly, all the terminals of all the windings being directed towards one side of the coil and electrically connected on the outer surface thereof.

It is advisable that the first terminal of the outer winding and the second terminal of the intermediate winding should be connected to a power supply, while the first terminals of the intermediate and inner windings be brazed to the second terminals of the inner and outer windings, respectively, whereby the three windings are electrically connected in series.

A multiturn coil assembly for field poles of a dynamoelectric machine, according to the present invention, increases the useful height of the coil in each of the rows by one turn, which results in a compact filling up of the space around the coil core.

Other and further objects and advantages of the invention will be better understood from the following description taken in conjunction with the accompanying drawings illustrating a preferred embodiment of the invention, wherein.

Figure 1:
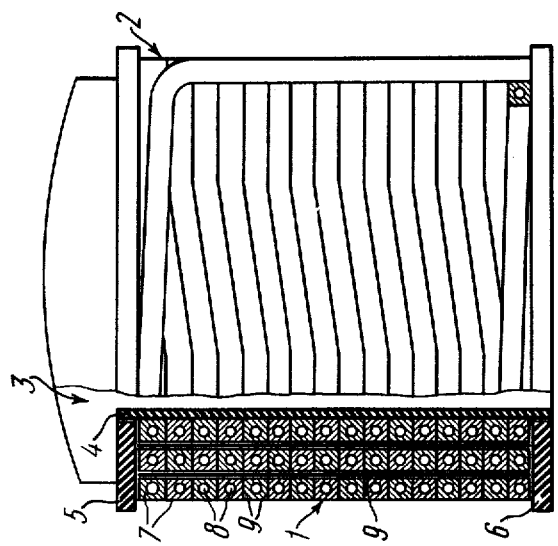
FIG. 1 is a partially cut cross-section view of a dynamoelectric machine pole with a multiturn coil mounted thereon, in accordance to the invention.

Referring now to FIG. 1, a multiturn coil 1 of a dynamoelectric machine pole 2 comprises three vertical rows of turns and sixteen horizontal layers of turns wound on a core 3 with an insulating layer 4 between the core 3 and windings 12, the winding turns being arranged between an upper insulating washer 5 and a lower insulating washer 6.

The pole coil is formed from copper conductors 7 substantially rectangular in cross section, having openings 8 for circulation of the cooling water and an insulation 9 provided between the conductors 7 in a conventional manner.

Figure 2:
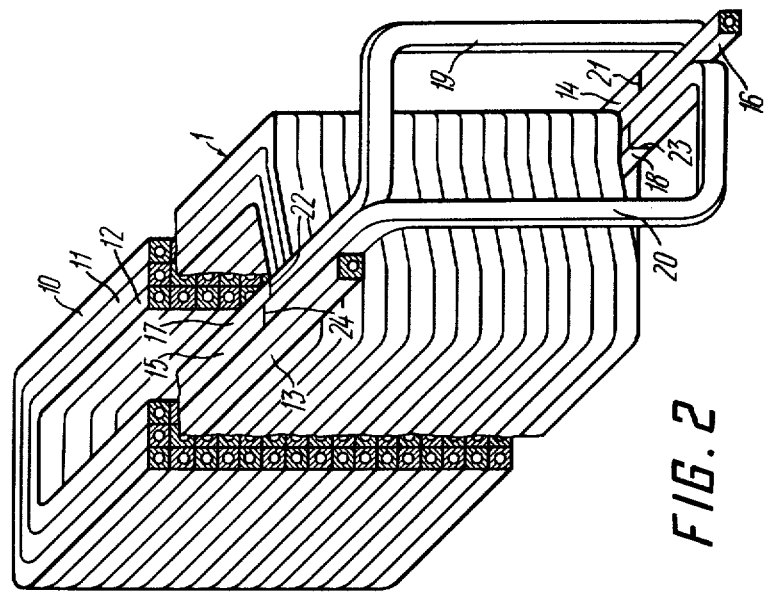
FIG. 2 is a cut-away perspective view of a multiturn pole coil without insulation between adjacent turns, in accordance to the invention.

As can be seen from FIG. 2 the multiturn coil 1 includes three concentrically arranged windings 10, 11 and 12.

The inner peripheral dimension of the outer winding 10 is substantially equal to the outer peripheral dimension of the intermediate winding 11, while the inner peripheral dimension of the intermediate winding is substantially equal to the outer peripheral dimension of the inner winding 12. Each of said windings 10, 11 and 12 has an equal number of turns, namely sixteen turns, wound in one vertical row.

The outer winding 10 has terminals 13 and 14, the intermediate winding 11 has terminals 15 and 16, and the inner winding 12 has terminals 17 and 18, respectively.

The windings 10, 11, 12 are wound in the same direction and oriented so that their first terminals 13, 15, 17, respectively, are positioned adjacent one another on the upper end surface of the coil 1, while their second terminals 14, 16, 18, respectively, are positioned on the lower end surface of the coil 1, all the terminals of the windings 10, 11 and 12 having the same orientation.

Connectors 19 and 20 of the terminals of the windings 10, 11 and 12 are bent according to the conductor cross section, as shown in FIG. 2, and arranged outside one of the side surfaces of the coil assembly 1.

The windings 10, 11 and 12 are electrically connected in series, the terminal 13 of the outer winding 10 being connected to a power supply (not shown) and the terminal 14 of the winding 10 being connected to the terminal 17 of the inner winding 12 via the connector 19 brazed at 21 and 22. The second terminal 18 of the inner winding 12 is electrically connected to the terminal 15 of the intermediate winding 11 via the connector 20 brazed at 23, 24, and the terminal 16 of the intermediate winding 11 is also connected to a power supply (not shown).

Thus, with an odd number of turns, the main terminals of the coil assembly 1 are the terminals 13, 16 of the outer and intermediate windings.

Such a coil is assembled from individual windings or made by simultaneous winding of a three-row coil on a single form with insulation between the rows.

The proposed multiturn coil, according to the invention permits winding any number, even or odd, of horizontal layers of turns at minimum coil height, makes its manufacture, assembly and testing easier, simplifies service during operation and increases the realibility of an electric machine by decreasing the number of brazed joints and arranging them outside the coil assembly.

While the invention has been described herein in terms of the preferred embodiments, numerous variations may be made in the apparatus illustrated in the drawings and herein described without departing from the invention as set forth in the appended claims.

What is claimed is:

1. A multiturn coil assembly comprising:
   outer, intermediate and inner electrically interconnected windings, having conduit means for passing of a cooling fluid therethrough,
   each winding occupying a single vertical row of turns over the entire coil height, being wound with an equal number of turns stacked in the same direction as the other windings, and having first and second terminals;
   said windings being concentrically arranged so that the inner peripheral dimension of said outer winding is substantially equal to the outer peripheral dimension of said intermediate winding, and the inner peripheral dimension of said intermediate winding is substantially equal to the outer peripheral dimension of said inner winding;
   each winding being oriented so that said first terminals of all the windings are positioned adjacent one another and adjacent one end surface of said coil assembly, while said second terminals of all the windings are positioned adjacent one another and adjacent the other end surface of said coil assembly;
   all the terminals of all the windings being directed towards only one side of the coil assembly and electrically interconnected adjacent the outer surface of said one side of the coil by means of nonintersecting connectors;
   said connectors also serving as conduits for passing a cooling fluid therethrough.

2. A coil assembly according to claim 1, wherein said first terminal of said outer winding and said second terminal of said intermediate winding are connected to a power supply, while said first terminal of said intermediate winding is brazed to said second terminal of said inner winding, and said first terminal of said inner winding is brazed to said second terminal of said outer winding, whereby said three windings are electrically connected in series.

3. A coil assembly according to claim 1, wherein said windings comprise hollow conductors.

4. A coil assembly according to claim 3, wherein each of said conductors has a rectangular cross-section.

5. A coil assembly according to claim 4, wherein said coil assembly has a generally rectangular configuration.

* * * * *